United States Patent [19]
Martinez

[11] Patent Number: 5,999,177
[45] Date of Patent: *Dec. 7, 1999

[54] METHOD AND SYSTEM FOR CONTROLLING CONTENT ON A DISPLAY SCREEN IN A COMPUTER SYSTEM

[75] Inventor: Anthony Edward Martinez, Lakeway, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,799

[22] Filed: Jul. 7, 1997

[51] Int. Cl.⁶ .............................. G06F 3/00; G06F 3/14; G09G 5/34
[52] U.S. Cl. ...................... 345/341; 345/342; 707/539
[58] Field of Search .................................. 345/340, 341, 345/342; 707/530, 539

[56] References Cited

U.S. PATENT DOCUMENTS

| | | |
|---|---|---|
| 4,890,098 | 12/1989 | Dawes et al. ........................... 345/340 |
| 4,907,174 | 3/1990 | Priem ...................................... 364/521 |
| 5,065,347 | 11/1991 | Pajak et al. ............................. 395/159 |
| 5,095,448 | 3/1992 | Obuchi et al. .......................... 707/519 |
| 5,196,838 | 3/1993 | Meier et al. ............................ 345/118 |
| 5,204,944 | 4/1993 | Wolberg et al. ....................... 395/127 |
| 5,305,435 | 4/1994 | Bronson ................................. 395/159 |
| 5,317,306 | 5/1994 | Abraham et al. ...................... 345/118 |
| 5,469,540 | 11/1995 | Powers, III et al. ................... 395/158 |
| 5,502,805 | 3/1996 | Anderson et al. ..................... 345/340 |
| 5,623,282 | 4/1997 | Graham et al. ........................ 345/121 |
| 5,634,095 | 5/1997 | Wang et al. ............................ 345/326 |

*Primary Examiner*—Raymond J. Bayerl
*Assistant Examiner*—X. L. Bautista
*Attorney, Agent, or Firm*—Sawyer & Associates; Volel Emile

[57] ABSTRACT

The present invention provides a method and system for controlling content on a display of a computer system. The method and system comprises providing at least one control element on the display, moving the at least one control element selectively between a first position and a second position on the window. The method and system further includes the content between the first and second positions. The at least one control element allows the user to "fold" windows of information like a piece of paper, at any location, to hide information that is not of interest to the user.

48 Claims, 7 Drawing Sheets

METHOD AND SYSTEM FOR CONTROLLING CONTENT ON A DISPLAY SCREEN IN A COMPUTER SYSTEM

FIELD OF THE INVENTION

The present invention relates generally to a computer system and more particularly to a method and system for controlling content on a display in such a computer system.

BACKGROUND OF THE INVENTION

Computers that include one or more windows on a display screen have been in existence for more than a decade. However, the amount of control that a user has over the content within the window of a display has changed very little. For example, it is known that a window on a display screen can be resized or repositioned. It is also known that resizing a window usually results in sacrificing or removing content located at the bottom, top or sides of the window. In most applications, there is very little control over what portion of the content is eliminated and the relationship of that information that has been eliminated to the rest of the content in the window.

In addition, windows that are used in conventional applications do not allow for the display of noncontiguous or nonadjacent rows and columns. To further illustrate this problem, refer now to FIGS. 1 through 3. FIG. 1 illustrates a window 10 on a computer display 11 which displays information in columns. As is seen, columns 1 through 7 contain information in a column format. Referring now to FIG. 2, what is shown is a window 10' on the display 11' which displays content a row format through rows 1 through 10. FIG. 3 illustrates a window 10" which includes a status area 15 on a bottom portion of a window in which the information is provided in rows and columns. As is seen, each of the windows 10, 10' and 10" of FIGS. 1, 2 and 3 includes a titlebar 14 at a top portion of the window which includes control elements 16 and 18 which are traditionally used for a variety of functions. For example, the control element 16 is used to move the window around the display screen and control element 18 closes the window.

Conventional windows do not allow for flexibility when viewing content within the window. Hence, for example, it is not possible to see column 2 and column 6 side by side utilizing conventional applications. Similarly, referring now to FIG. 2, if it is desired to view rows 3 and 9 side by side, it is not possible in conventional applications. Finally, referring to FIG. 3, there may be a desire to remove the status area 15 because it serves no useful purpose, but once again using conventional applications it can not be eliminated.

In addition, although the FIGS. 1 through 3 show one window on a display, it is well recognized that a display screen associated with a computer system may have multiple windows thereon that are being viewed. It is desirable to selectively remove content therein to minimize the usage of "real estate", i.e. space, on the display screen when viewing multiple windows.

Accordingly, what is needed is a system and method for controlling content on a display screen in a computer system which allows for selective elimination of certain information therewithin while preserving the integrity of the information that is remaining. The system should be easy to use, should be adaptable to existing applications, and should be easy to implement. The present invention addresses these needs.

SUMMARY OF THE INVENTION

The present invention provides a method and system for controlling content on a display of a computer system. The method and system comprises providing at least one control element on the display, moving the at least one control element selectively between a first position and a second position on the window. The method and system further includes hiding the content between the first and second positions. The at least one control element allows the user to "fold" windows of information like a piece of paper, at any location, to hide information that is not of interest to the user.

DESCRIPTION OF THE INVENTION

The present invention relates to a method and system for controlling content on a computer display screen. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 4:
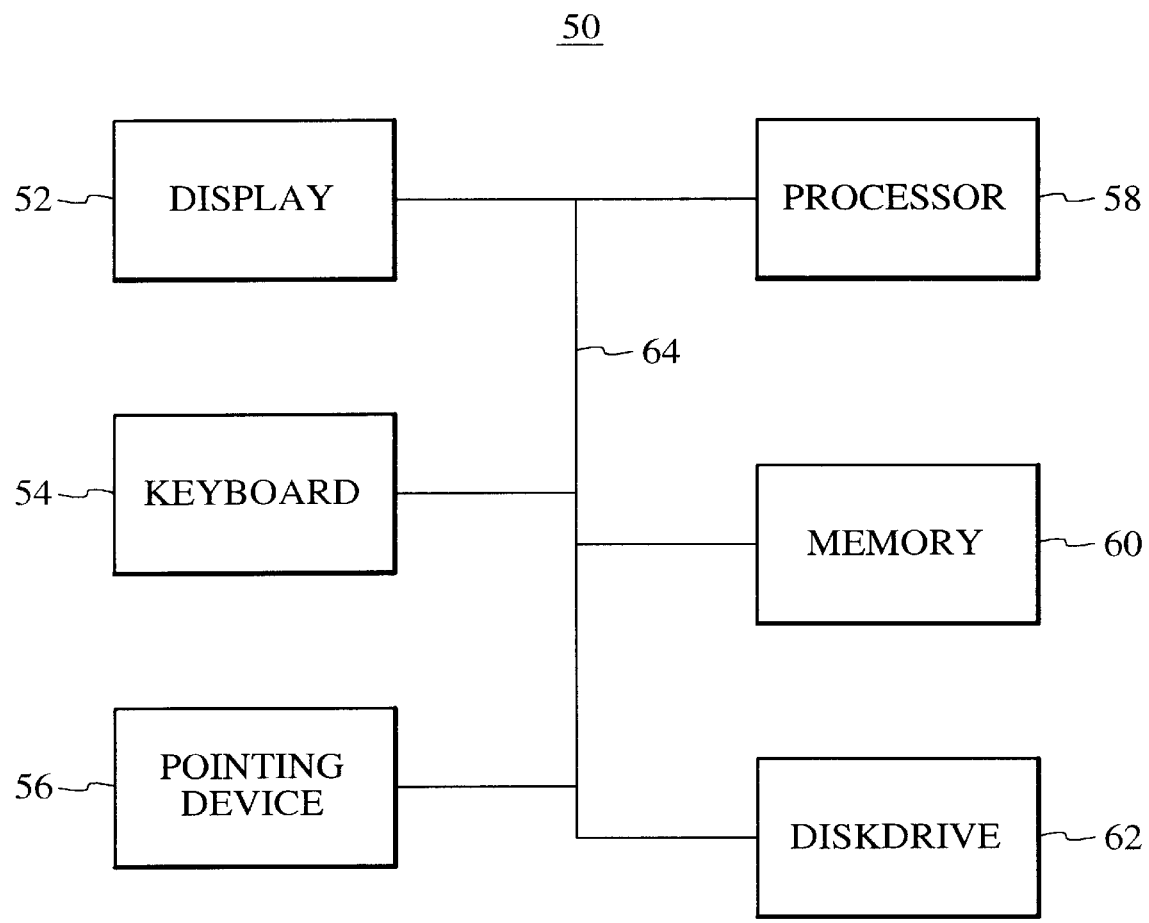
FIG. 4 is a block diagram of a computer system.

FIG. 4 is a block diagram of a system in which the present invention resides. The system 50 includes a display 52, a keyboard 54, a pointing device 56, a processor 58, memory 60, and a disk drive 62. The components of the system 50 are shown to be connected by a bus 64.

The present invention allows for a user to control the content of a window which is displayed on a display of a computer system. In so doing, the user can review information in nonadjacent columns or rows and in the appropriate circumstance eliminate unwanted information that is within the display.

Figure 1:
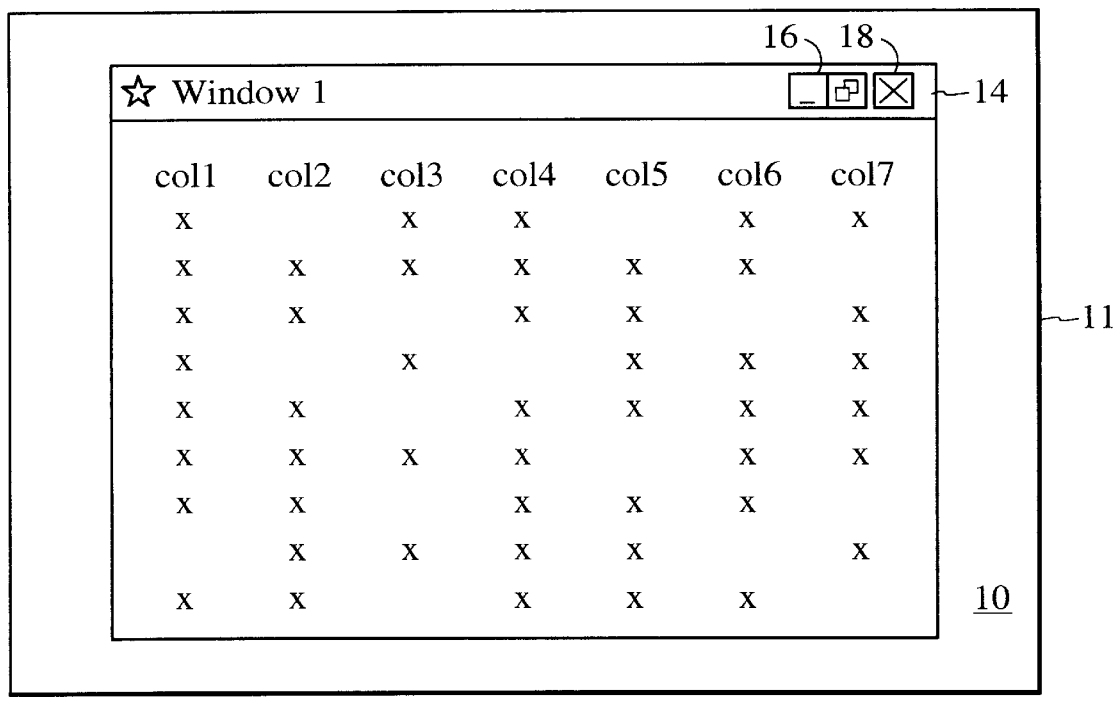
FIG. 1 is a front view of a window showing information contained in columns.
Figure 2:
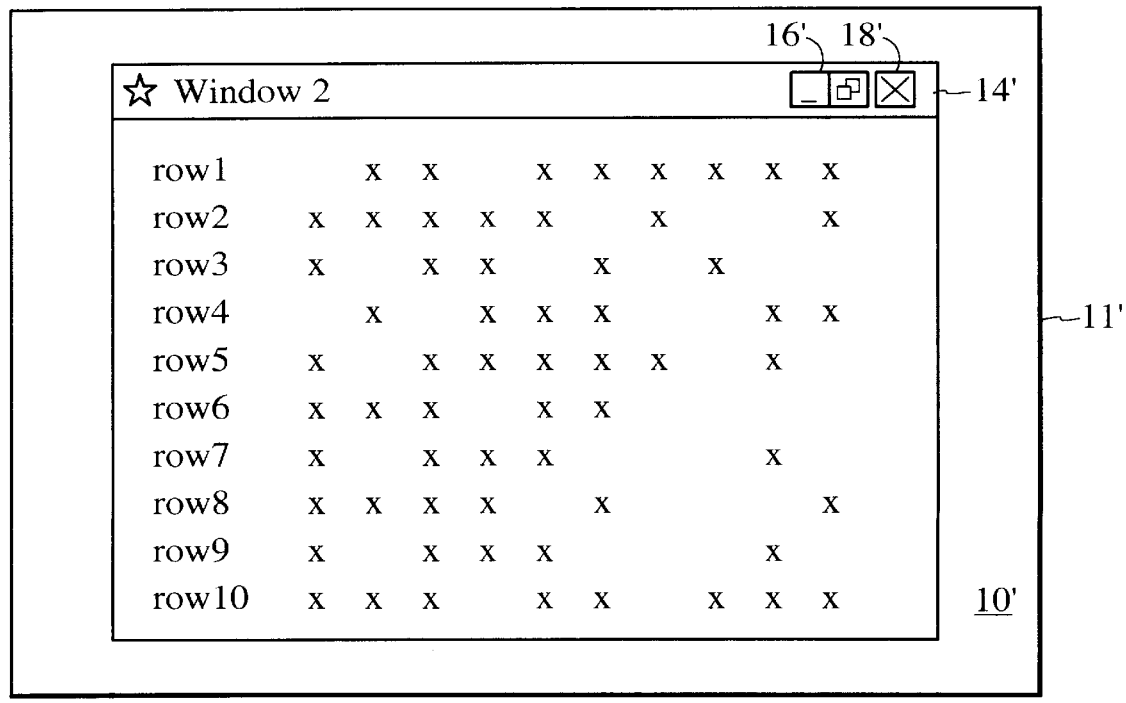
FIG. 2 is a front view of a window showing information contained in rows.
Figures 3, 5:
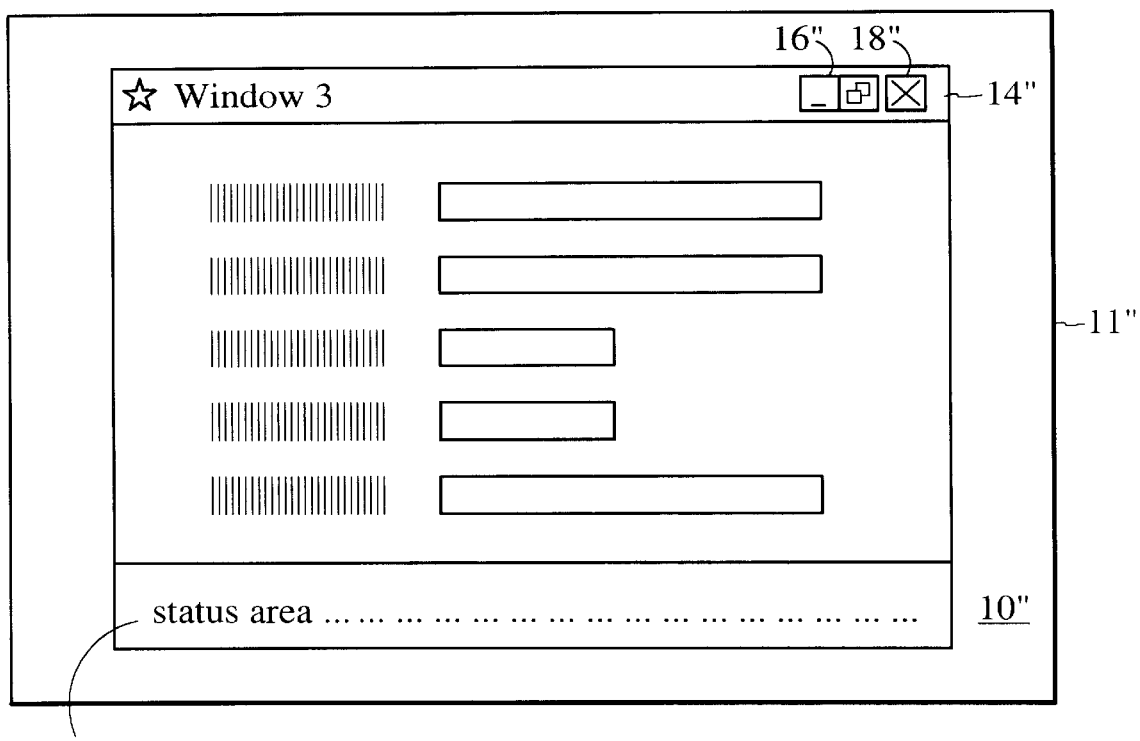
FIG. 3 is a front view of a window showing a status area.
FIG. 5 shows a window on a display in accordance with the present invention.

Referring now to FIG. 5, a window 100 is shown on a display screen that includes a plurality of columns 1–7. In addition to the other control elements 16', 16' and 18', the window 100 also includes a new control element referred to as a fold control element 102. The fold control element 102 is utilized advantageously to create folds in the window like a piece of paper to selectively hide/show content within the display screen. To more particularly describe the use of this control, refer to the following figures in conjunction with the accompanying discussion.

Figure 6:
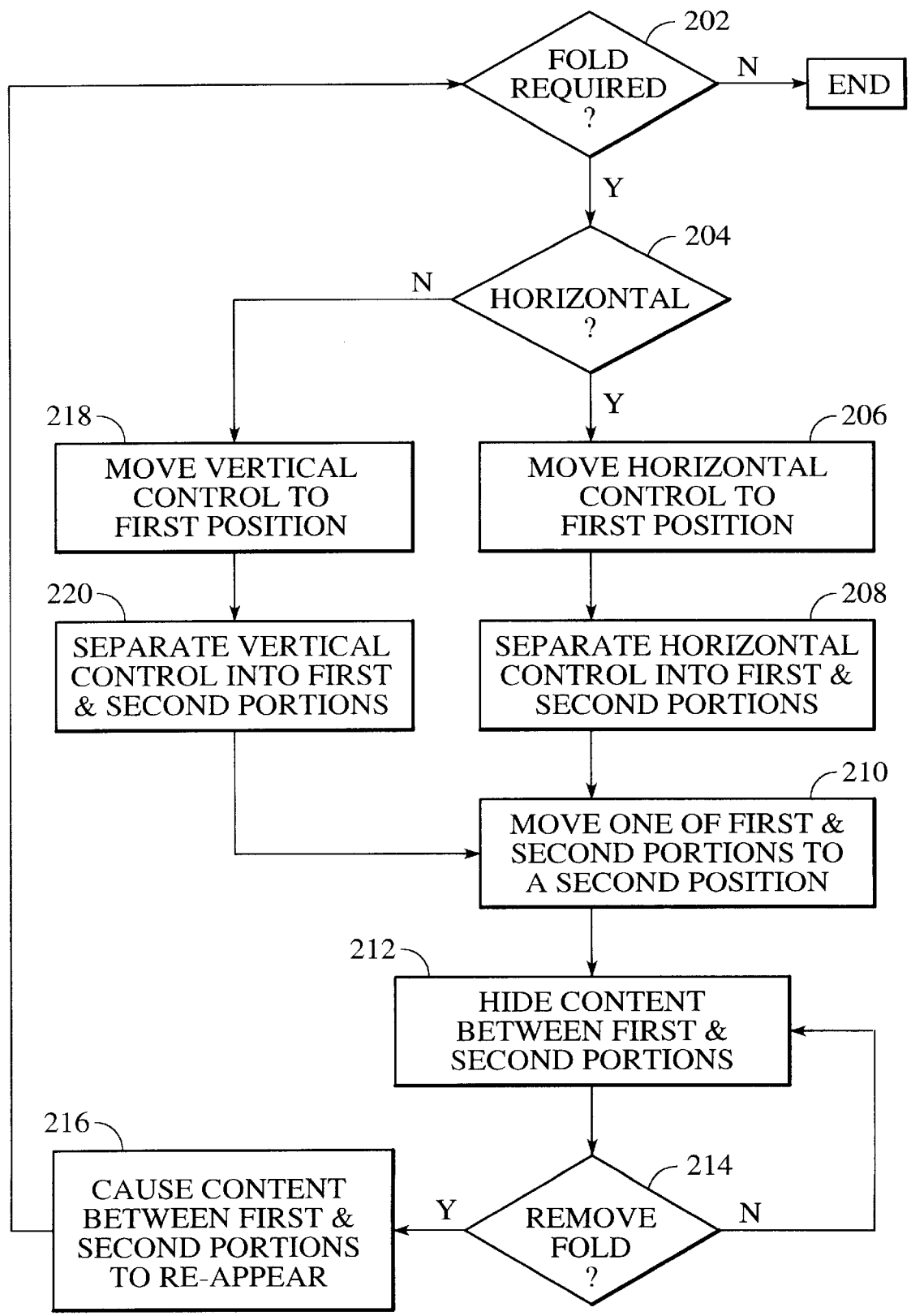
FIG. 6 shows a flow chart of the operation of a fold control in accordance with the present invention.
Figure 7:
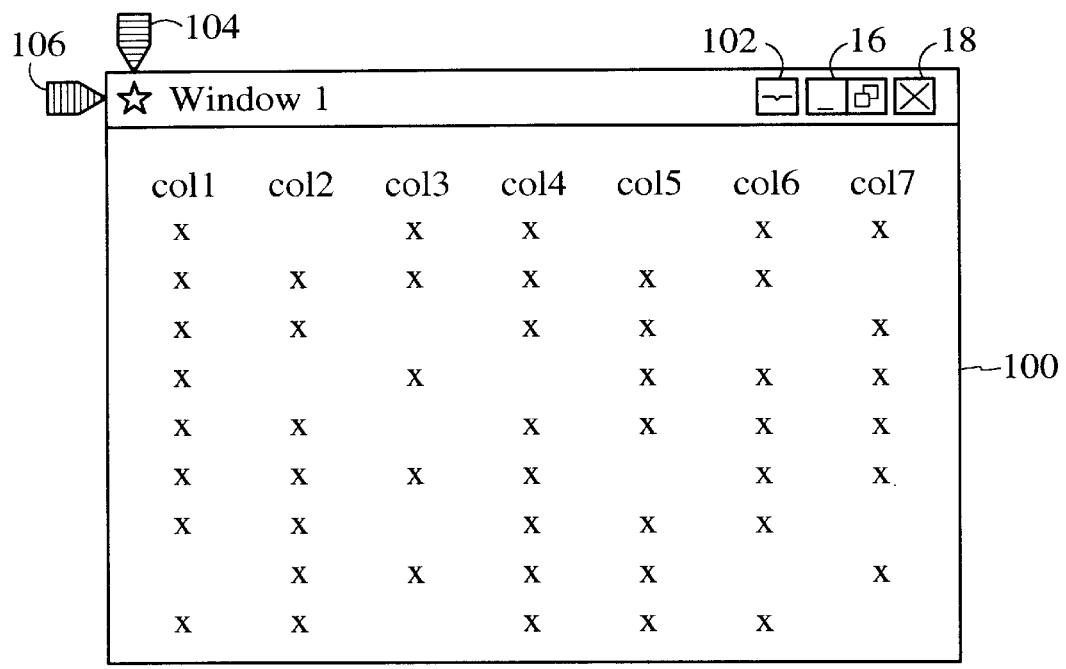
FIGS. 7–12 show in more detail the operation of the fold control element when selectively hiding or showing columns within the window of a display.

To more clearly describe the operation of the fold control 102, refer now to FIG. 6, which is a flow chart of the operation of the flow control in accordance with the present invention. First, it is determined if a fold is required, via step 202. Then the next step is to determine whether the fold is horizontal, via step 204. If the fold is to be horizontal, then a copy of a horizontal control element is moved to a first position on the display, via step 206. Next the control element separates into a first and second portions, via step 208. Thereafter one of the first and second portions of the horizontal control element is moved to a second position on the display, via step 210, and finally, the content between the first and second positions is hidden, via step 212. Next, it is determined if the fold is to be removed, via step 214. If it is not to be removed, return to step 216. If it is to be removed, then the content between the first and second portions should reappear. Similarly, if it is a vertical fold, via step 214, the vertical fold control element is moved to a first vertical position on the display, via step 218. Next, the horizontal element is separated into first and second vertical portions, via step 220. Next, one of the first and second portions of the horizontal control element is moved to a second horizontal position, via step 210, and then the content between the first and second positions is hidden, via step 212. Finally, steps 214 and 216 are repeated as described above.

FIGS. 7–12 show in more detail the operation of the fold control element 102 when selectively hiding or showing columns within the window of a display. Initially, as is seen, in FIG. 7, the fold control element is pressed and in this embodiment two control elements 104 and 106 are shown. In this embodiment, control element 104 is utilized to provide a horizontal fold. Control element 106 provides a vertical fold. First the horizontal fold control will be described.

Figure 8:
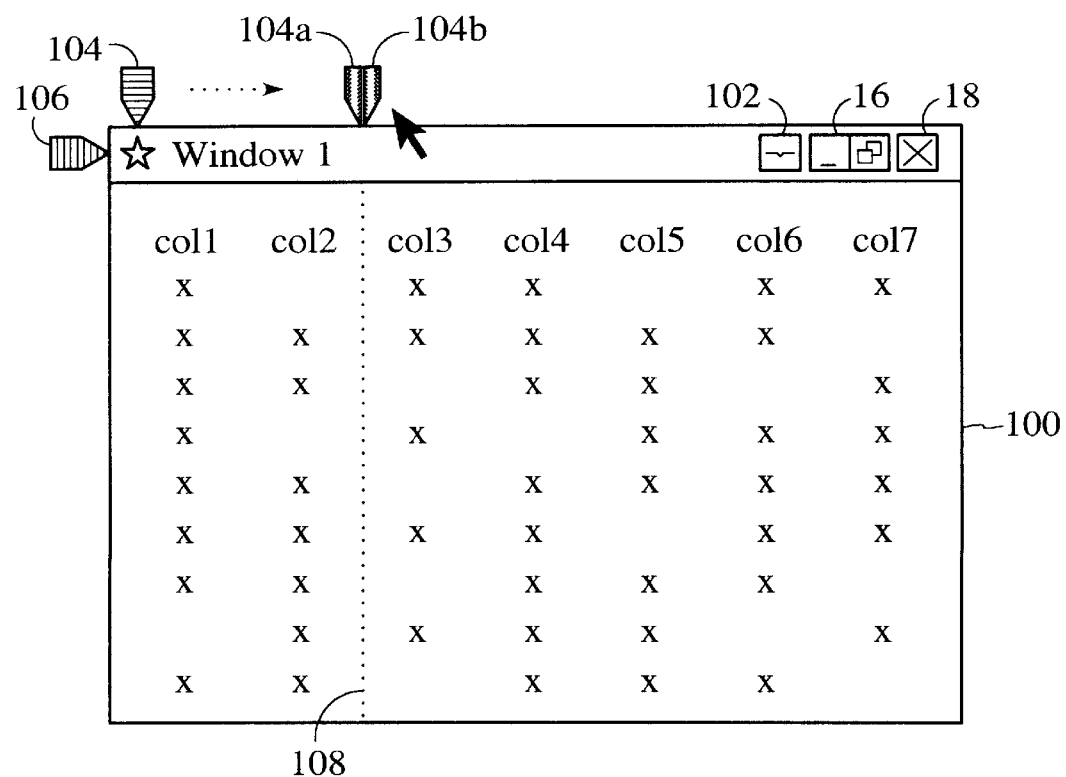

As is seen in FIG. 8, first a copy of the control element 104 is moved a predetermined distance. In this embodiment, the fold is begun between columns 2 and 3. The movement of the copy of the control elements 104 and 106 can be accomplished in a variety of fashions, for example, by using a mouse (not shown) to drag the control to the right, using some type of pointing device (not shown) or some other device to provide the beginning of the fold. As is also seen, in a preferred embodiment, there is a dotted line 108 which will indicate the boundary of the area that is being hidden. When the initial move is completed, as is seen in the figure, the copy of the fold control element 104 changes in appearance by splitting in the middle, into a first and second portions 104a and 104b.

Figure 9:
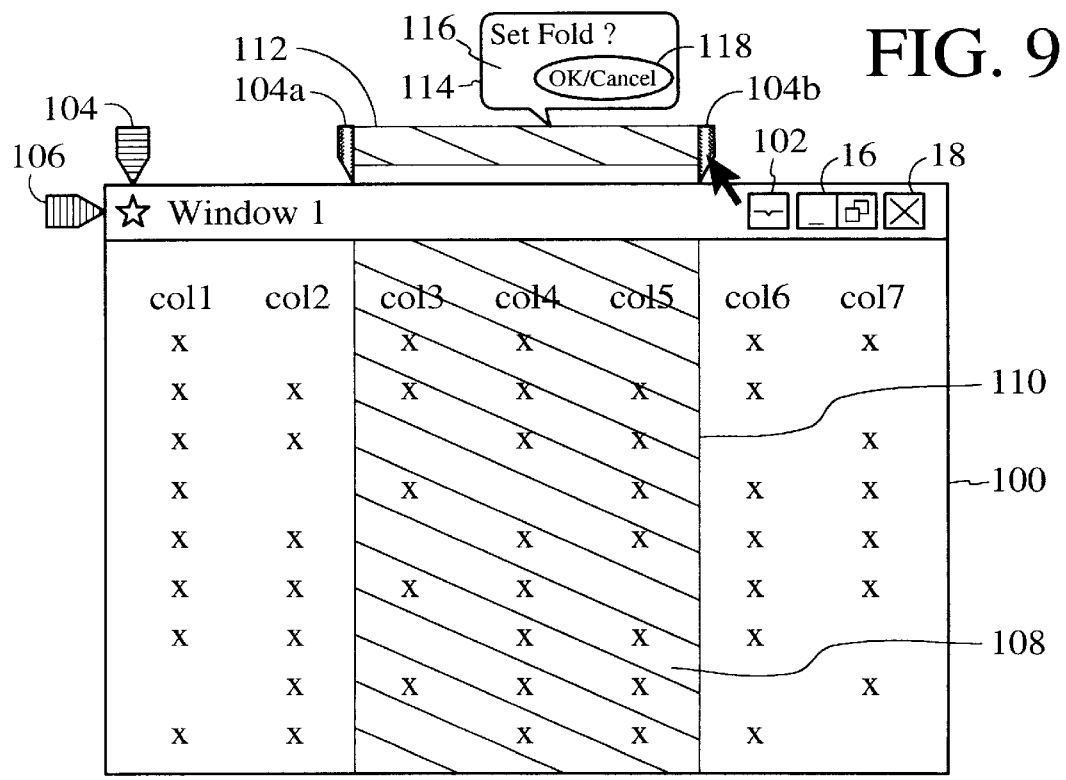

Referring now to FIG. 9, once it is determined that the beginning position of first and second portions 104a and 104b is correct, then the first or second portion 104a and 104b can be moved to finish the fold. It should be recognized that the separation of the control element 104 into two portions and the subsequent movement of one of the portions is an optional step. For example, the control element 104 could be set at a first position and then by some user interaction, such a mouse click, a first position of the fold is set. Thereafter the control element 104 could be set at a second position, then by a user interaction a second position of the fold is set.

In this embodiment, the second portion 104b is moved to a second position between columns 5 and 6. As is also seen, the dotted line 108 moves to a mid-point between the first and second portions 104a and 104b. In a preferred embodiment there is a shaded area 110 indicated between columns 2–6. In addition there is a shaded area 112 between the first and second portions 104a and 104b of the control element 104. The shaded area 110 indicates the content to be hidden. When the second position is set, in a preferred embodiment a set fold dialog box 114 pops up. This dialog box 114 is utilized to indicate whether the fold is to be made or not within the window 100. Accordingly, in this embodiment, if the OK button 116 is pressed, the fold can be made. If the cancel button 118 is pressed, then the shaded area will be eliminated and the fold control will be reset. Until one of the buttons are pressed on the set fold dialog box 114, the shaded areas 108 and 112 can be increased or decreased in whatever manner the user desires.

Figure 10:
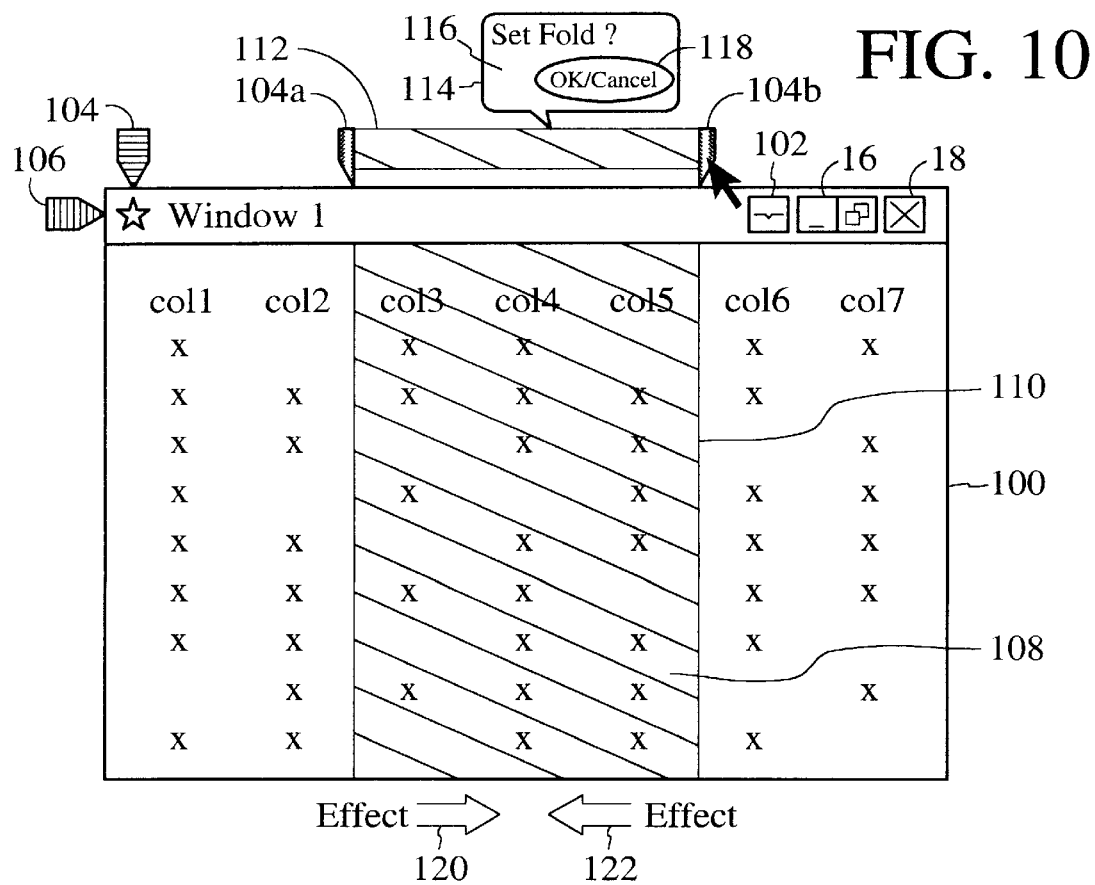
Figure 11:
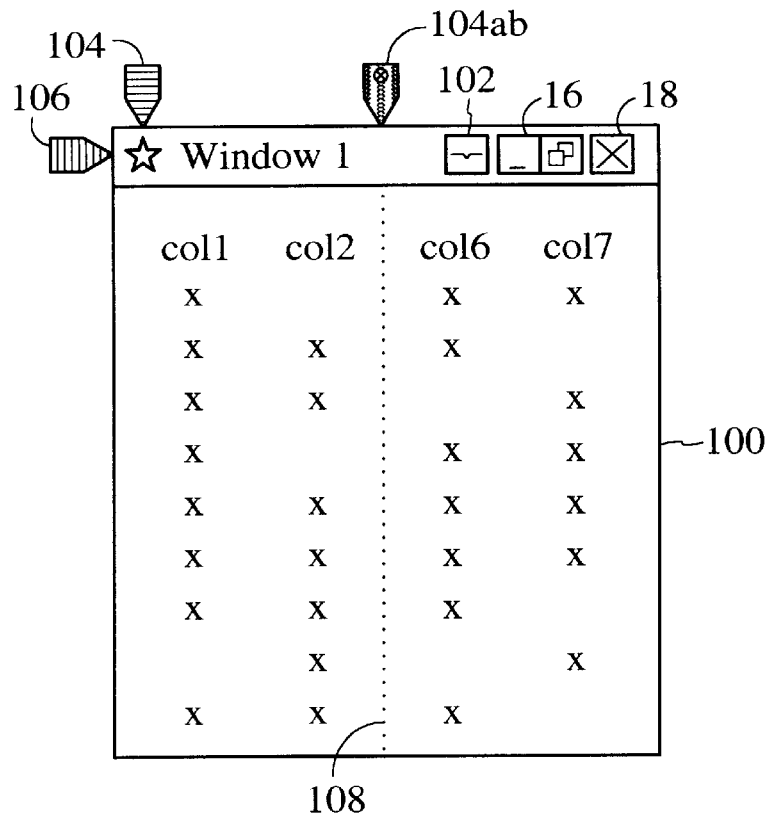

Referring now to FIG. 10, as is seen when OK is pressed on the dialog box 114, the fold is activated preferably with a visual effect of moving inward as shown by the arrows 120 and 122. Referring now to FIG. 11, the marked area between columns 2 and 6 is now hidden. Only the dotted line 108 remains to indicate the presence of a fold. As is also seen, the copy of the horizontal fold control element 104 is one element. As is also seen, the copy of the horizontal fold control 104 has an X therewithin providing a further indication that a fold is provided. In a embodiment, the X can be pressed to restore the original content.

Figure 12:
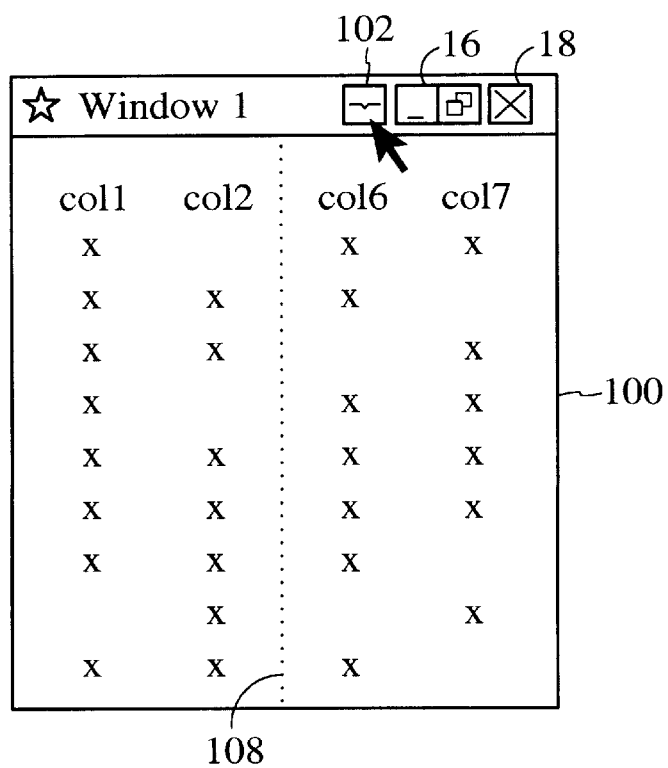

In FIG. 11, as is seen, the fold control element 104 easily allows one to compare nonadjacent columns of information. Referring now to FIG. 12, the fold control element 104 and its copy can can be removed by clicking or pressing on the fold control 102. In addition, the same type of procedure could be followed with the vertical fold control element 106 to hide the contents between nonadjacent rows.

Accordingly a system and method is provided that allows a user to "fold" content within a window like a piece of paper to selectively hide and reveal content. Through a system and method in accordance with the present invention, related nonadjacent information can be easily viewed. In addition, valuable real estate within a display of a computer system can be saved by eliminating unuseful information, such a status bars and the like.

Although the present invention has been described in accordance with the embodiments shown, one of ordinary skill in the art will readily recognize that there could be variations to the embodiments and those variations would be within the spirit and scope of the present invention. For example, although a copy of the vertical and horizontal fold control elements 104 and 106 are utilized to create the fold, it is clear that the fold control elements could be used to create the folds. Accordingly, many modifications may be made by one of ordinary skill in the art without departing from the spirit and scope of the appended claims.

What is claimed is:

1. A method of selectively controlling content within a window on a display of a computer system, comprising the steps of:
    (a) providing at least one control element on the window;
    (b) separating the at least one control element into first and second portions;
    (c) moving one of the first and second portions to a second position on the window; and
    (d) hiding the content between the first and second positions.

2. The method of claim 1 wherein the moving step (b) includes the steps of:
    (b1) separating the at least one control element into first and second portions; and
    (b2) moving one of the first and second portions to a second position on the window.

3. The method of claim 2 wherein the vertical fold control element causes the content between a first and second vertical positions of the window to be hidden.

4. The method of claim 3 wherein the content between the first and second vertical positions is shaded.

5. The method of claim 4 wherein the first position includes a line for providing a fold position.

6. The method of claim 5 wherein the line moves based upon movement of one of a first and second portions of the vertical fold control element.

7. The method of claim 6 wherein the line is dotted.

8. The method of claim 7 wherein the fold position is based upon being between a mid-point of the first and second portions of the vertical control element.

9. The method of claim 8 wherein a copy of the at least one control element is utilized to provide the fold.

10. The method of claim 2 wherein the horizontal fold control element causes the content between the first and second horizontal positions of the window to be hidden.

11. The method of claim 10 wherein the content between the first and second horizontal positions is shaded.

12. The method of claim 11 wherein the first position includes a line for providing a fold position.

13. The method of claim 12 wherein the line moves are based upon movement of one of a first and second portions of the horizontal fold control element.

14. The method of claim 13 wherein the line is dotted.

15. The method of claim 14 wherein the fold position is based upon being between a mid-point of the first and second portions of the horizontal control element.

16. The method of claim 15 wherein a copy of the at least one control element is utilized to provide the fold.

17. A system of selectively controlling content within a window on a display of a computer system, comprising:
means for providing at least one control element on the window;
means for separating the at least one control element into first and second portions;
means for moving one of the first and second portions to a second position on the window;
means for hiding the content between the first and second positions.

18. The system of claim 17 in which the providing means comprises:
means for providing a horizontal fold control element; and
means for providing a vertical fold control element.

19. The system of claim 18 wherein the vertical fold control element causes the content between a first and second vertical positions of the window to be hidden.

20. The system of claim 19 wherein the content between the first and second vertical positions is shaded.

21. The system of claim 20 wherein the first position includes a line for providing a fold position.

22. The system of claim 21 wherein the line moves based upon movement of one of a first and second portions of the vertical fold control element.

23. The system of claim 22 wherein the line is dotted.

24. The system of claim 23 wherein the fold position is based upon being between a mid-point of the first and second portions of the vertical control element.

25. The system of claim 24 wherein a copy of the at least one control element is utilized to provide the fold.

26. The system of claim 18 wherein the horizontal fold control element causes the content between the first and second horizontal positions of the window to be hidden.

27. The system of claim 26 wherein the content between the first and second horizontal positions is shaded.

28. The system of claim 27 wherein the first position includes a line for providing a fold position.

29. The system of claim 28 wherein the line moves are based upon movement of one of a first and second portions of the horizontal fold control element.

30. The system of claim 29 wherein the line is dotted.

31. The system of claim 30 wherein the fold position is based upon being between a mid-point of the first and second portions of the horizontal control element.

32. The system of claim 31 wherein a copy of the at least one control element is utilized to provide the fold.

33. A method of selectively controlling content within a window on a display of a computer system, comprising the steps of:
(a) providing a horizontal fold control element;
(b) providing a vertical fold control element, wherein the vertical fold control element causes the content between a first and second vertical positions of the window to be hidden, wherein the content between the first and second vertical positions is shaded, wherein the first position includes a line for providing a fold position, wherein the line moves based upon movement of one of a first and second portions of the vertical fold control element;
(c) moving the horizontal fold control element and the vertical fold control element selectively between a first position and a second position on the window; and
(d) hiding the content between the first and second positions.

34. The method of claim 33 wherein the line is dotted.

35. The method of claim 34 wherein the fold position is based upon being between a mid-point of the first and second portions of the vertical control element.

36. The method of claim 35 wherein a copy of the at least one control element is utilized to provide the fold.

37. A method of selectively controlling content within a window on a display of a computer system, comprising the steps of:
(a) providing a horizontal fold control element, wherein the horizontal fold control element causes the content between a first and second horizontal positions of the window to be hidden, wherein the content between the first and second horizontal positions is shaded, wherein the first position includes a line for providing a fold position, wherein the line moves based upon movement of one of a first and second portions of the horizontal fold control element;
(b) providing a vertical fold control element;
(c) moving at least the horizontal fold control element or the vertical fold control element selectively between a first position and a second position on the window; and
(d) hiding the content between the first and second positions.
means for hiding the content between the first and second positions.

38. The method of claim 37 wherein the line is dotted.

39. The method of claim 38 wherein the fold position is based upon being between a mid-point of the first and second portions of the horizontal control element.

40. The method of claim 39 wherein a copy of the at least one control element is utilized to provide the fold.

41. A system of selectively controlling content within a window on a display of a computer system, comprising:
means for providing a horizontal fold control element;
means for providing a vertical fold control element, wherein the vertical fold control element causes the content between a first and second vertical positions of the window to be hidden, wherein the content between the first and second vertical positions is shaded, wherein the first position includes a line for providing a fold position, wherein the line moves based upon movement of one of a first and second portions of the vertical fold control element;

means for moving at least the first or the second portions to a second position on the window;

means for hiding the content between the first and second positions.

42. The system of claim 41 wherein the line is dotted.

43. The system of claim 42 wherein the fold position is based upon being between a mid-point of the first and second portions of the vertical control element.

44. The system of claim 43 wherein a copy of the at least one control element is utilized to provide the fold.

45. A system of selectively controlling content within a window on a display of a computer system, comprising:

means for providing a horizontal fold control element, wherein the horizontal fold control element causes the content between a first and second horizontal positions of the window to be hidden, wherein the content between the first and second horizontal positions is shaded, wherein the first position includes a line for providing a fold position, wherein the line moves based upon movement of one of a first and second portions of the horizontal fold control element;

means for providing a vertical fold control element;

means for moving at least the first or the second portions to a second position on the window;

means for hiding the content between the first and second positions.

46. The system of claim 45 wherein the line is dotted.

47. The system of claim 46 wherein the fold position is based upon being between a mid-point of the first and second portions of the horizontal control element.

48. The system of claim 47 wherein a copy of the at least one control element is utilized to provide the fold.

\* \* \* \* \*